US008280579B2

(12) United States Patent
Yasue et al.

(10) Patent No.: US 8,280,579 B2
(45) Date of Patent: Oct. 2, 2012

(54) MEMORY MANAGEMENT APPARATUS

(75) Inventors: Motohiro Yasue, Chiryu (JP); Takeshi Suganuma, Kariya (JP)

(73) Assignee: Denso Corporation, Kariya (JP)

( * ) Notice: Subject to any disclaimer, the term of this patent is extended or adjusted under 35 U.S.C. 154(b) by 1029 days.

(21) Appl. No.: 12/207,873

(22) Filed: Sep. 10, 2008

(65) Prior Publication Data

US 2009/0076681 A1 Mar. 19, 2009

(30) Foreign Application Priority Data

Sep. 14, 2007 (JP) .................................. 2007-239552

(51) Int. Cl.
*G01M 17/00* (2006.01)
*G06F 7/00* (2006.01)
*G06F 19/00* (2011.01)

(52) U.S. Cl. ......... 701/33.4; 701/1; 701/33.2; 701/33.3; 701/29.1

(58) Field of Classification Search ....................... 726/5
See application file for complete search history.

(56) References Cited

U.S. PATENT DOCUMENTS

| 4,307,455 | A | * | 12/1981 | Juhasz et al. ..................... 714/24 |
| 4,404,639 | A | * | 9/1983 | McGuire et al. ................. 701/35 |
| 4,823,305 | A | * | 4/1989 | Holdren et al. .................. 710/30 |
| 5,034,894 | A | * | 7/1991 | Abe ................................ 701/99 |
| 5,276,619 | A | * | 1/1994 | Ohara et al. ..................... 701/35 |
| 5,351,216 | A | | 9/1994 | Salt et al. |
| 5,506,773 | A | * | 4/1996 | Takaba et al. ................... 701/29 |
| 5,530,847 | A | * | 6/1996 | Schieve et al. ............. 714/38.13 |
| 5,541,840 | A | * | 7/1996 | Gurne et al. ..................... 701/33 |
| 5,671,141 | A | * | 9/1997 | Smith et al. ...................... 701/29 |
| 5,696,676 | A | * | 12/1997 | Takaba ............................. 701/31 |
| 5,890,086 | A | * | 3/1999 | Wellman et al. ................. 701/50 |
| 5,916,286 | A | * | 6/1999 | Seashore et al. ................ 701/29 |
| 6,067,009 | A | * | 5/2000 | Hozuka et al. ................ 340/459 |
| 6,151,541 | A | | 11/2000 | Iizuka |
| 6,225,898 | B1 | * | 5/2001 | Kamiya et al. ................ 340/505 |
| 6,230,082 | B1 | | 5/2001 | Harada et al. |
| 6,314,375 | B1 | * | 11/2001 | Sasaki et al. .................... 702/34 |

(Continued)

FOREIGN PATENT DOCUMENTS

JP 2002-342173 11/2002

(Continued)

OTHER PUBLICATIONS

Extended EP Search Report dated Dec. 11, 2008, issued in counterpart EP Application No. 08015958.5.

(Continued)

*Primary Examiner* — Khoi Tran
*Assistant Examiner* — Bhavesh V Amin
(74) *Attorney, Agent, or Firm* — Nixon & Vanderhye P.C.

(57) ABSTRACT

A vehicular memory management apparatus includes in an SRAM a mirror area for mirroring information from a PDTC storage area and an update information storage area for storing update information of the SRAM. When a fault is detected, a DTC is stored in both of the mirror area and a DTC storage area for maintaining consistency between the contents of the two areas, and the update information is updated. After confirming the consistency based on the update information, the information in the mirror area is copied to the PDTC storage area. Further, the information in the PDTC storage area is copied to the mirror area upon determining that the information in the mirror area is deleted based on the update information.

16 Claims, 13 Drawing Sheets

U.S. PATENT DOCUMENTS

| | | | |
|---|---|---|---|
| 6,401,163 B1 | 6/2002 | Kondo et al. | |
| 6,615,120 B1* | 9/2003 | Rother | 701/33 |
| 6,937,926 B2* | 8/2005 | Lipscomb et al. | 701/29 |
| 7,085,680 B2* | 8/2006 | Huang | 702/183 |
| 2002/0154646 A1* | 10/2002 | Dubois et al. | 370/406 |
| 2002/0193925 A1* | 12/2002 | Funkhouser et al. | 701/33 |
| 2004/0093137 A1 | 5/2004 | Okada | |
| 2005/0097288 A1 | 5/2005 | Holzmann | |
| 2005/0159923 A1* | 7/2005 | Huang | 702/183 |
| 2006/0184295 A1* | 8/2006 | Hawkins et al. | 701/33 |
| 2007/0180318 A1 | 8/2007 | Morozumi | |

FOREIGN PATENT DOCUMENTS

| | | |
|---|---|---|
| JP | 2004-021520 | 1/2004 |
| JP | 2004-178067 | 6/2004 |
| JP | 2007-102566 | 4/2007 |

OTHER PUBLICATIONS

Title 13, California Code Regulations, Section 1968.2, Malfunction and Diagnostic System Requirements for 2004 and Subsequent Model-Year Passenger Cars, Light-Duty Trucks, and Medium-Duty Vehicles and Engines (OBD II) 141 pages.

* cited by examiner

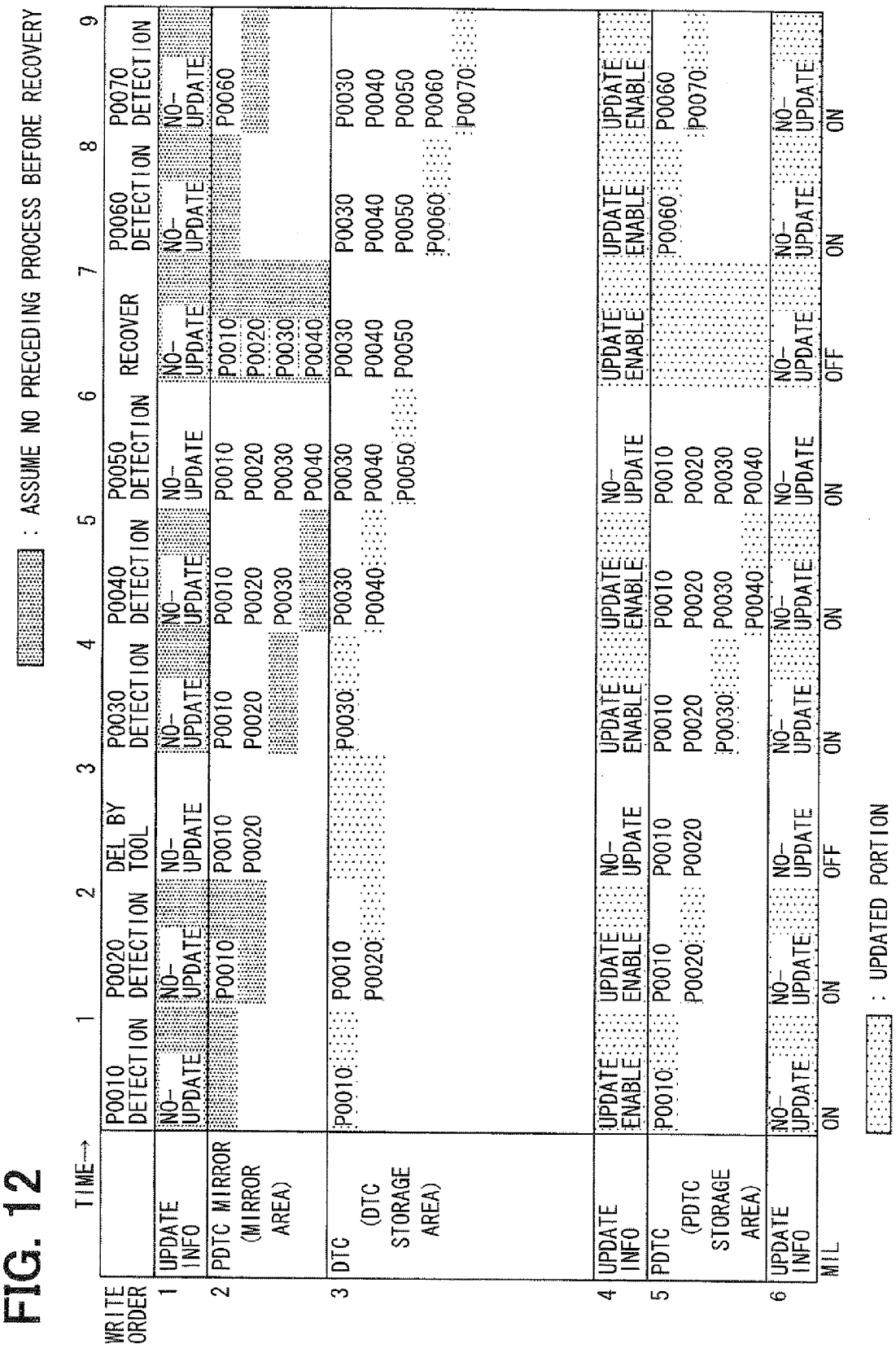

FIG. 13

▓ : ASSUME NO PRECEDING PROCESS BEFORE RECOVERY
░ : UPDATED PORTION

| WRITE ORDER | | TIME → | 10 | 11 | 12 | 13 | 14 | 15 | 16 | 17 | 18 |
|---|---|---|---|---|---|---|---|---|---|---|---|
| 1 | UPDATE INFO | | P0080 DETECTION | P0090 DETECTION | P0100 DETECTION | BATT CLEAR | BATT RECOVER | P0060 NORMAL | P0070 NORMAL | P0080 NORMAL | P0090 NORMAL |
| 2 | PDTC MIRROR (MIRROR AREA) | | NO-UPDATE | NO-UPDATE | NO-UPDATE | INI | INI | NO-UPDATE | NO-UPDATE | NO-UPDATE | NO-UPDATE |
| | | | P0060 | P0060 | P0060 | | P0060 | P0060 | | | |
| | | | P0070 | P0070 | P0070 | | P0070 | P0070 | P0070 | | |
| | | | P0080 | P0080 | P0080 | | P0080 | P0080 | P0080 | P0080 | |
| | | | | P0090 | P0090 | | P0090 | P0090 | P0090 | P0090 | P0090 |
| 3 | DTC (DTC STORAGE AREA) | | P0030 | P0030 | P0030 | | | | | | |
| | | | P0040 | P0040 | P0040 | | | | | | |
| | | | P0050 | P0050 | P0050 | | | | | | |
| | | | P0060 | P0060 | P0060 | | | | | | |
| | | | P0070 | P0070 | P0070 | | | | | | |
| | | | P0080 | P0080 | P0080 | | | | | | |
| | | | | P0090 | P0090 | | | | | | |
| | | | | | P0100 | | | | | | |
| 4 | UPDATE INFO | | UPDATE ENABLE | UPDATE ENABLE | NO-UPDATE | INI | UPDATE ENABLE | UPDATE ENABLE | UPDATE ENABLE | UPDATE ENABLE | UPDATE ENABLE |
| 5 | PDTC (PDTC STORAGE AREA) | | P0060 | P0060 | P0060 | P0060 | P0070 | | | | |
| | | | P0070 | P0070 | P0070 | P0070 | P0080 | P0070 | | | |
| | | | P0080 | P0080 | P0080 | P0080 | P0090 | P0080 | P0080 | | |
| | | | | P0090 | P0090 | P0090 | | P0090 | P0090 | P0090 | |
| 6 | UPDATE INFO | | NO-UPDATE | NO-UPDATE | NO-UPDATE | INI | NO-UPDATE | NO-UPDATE | NO-UPDATE | NO-UPDATE | NO-UPDATE |
| | MIL | | ON | ON | ON | OFF | OFF | OFF | OFF | OFF | OFF |

US 8,280,579 B2

MEMORY MANAGEMENT APPARATUS

CROSS REFERENCE TO RELATED APPLICATION

The present application is based on and claims the benefit of priority of Japanese Patent Application No. 2007-239552 filed on Sep. 14, 2007, the disclosure of which is incorporated herein by reference.

FIELD OF THE INVENTION

The present invention relates to a memory management apparatus for a vehicle, which is mounted on a vehicle.

BACKGROUND INFORMATION

Hitherto, in an electronic control unit (hereinbelow, called ECU) for controlling components in a vehicle, when a fault is detected in a predetermined object to be detected, according to the law, a diagnostic trouble code indicative of the fault is configured to be stored in a semiconductor memory (such as SRAM, EEPROM, or the like). An SRAM is also called as a backup RAM and is a volatile memory to which voltage is always supplied from a battery of a vehicle. An EEPROM is a nonvolatile memory.

According to the law, after a diagnostic trouble code is stored in a volatile memory (for example, in the SRAM), by the end of an ignition cycle (a period between turn-on of an ignition switch of the vehicle and the next turn-off, or between turn-off of the ignition switch and the next turn-on), the same code as the diagnostic trouble code has to be stored in the nonvolatile memory (for example, in the EEPROM).

It is expected that the law is determined in consideration of the fact that a diagnostic trouble code stored in the volatile memory is illegally deleted or a diagnostic trouble code disappears for some reason. For example, when the battery of a vehicle is removed and voltage is not supplied to the volatile memory, or when abnormality occurs in the volatile memory and the volatile memory is initialized, a diagnostic trouble code stored in the volatile memory code disappears. However, the diagnostic trouble code stored in the nonvolatile memory can be read. The diagnostic trouble codes stored in the volatile memory and the nonvolatile memory are used for analyzing a fault. For example, when a person in charge in a factory connects a fault diagnosis apparatus to the ECU communicatively and requests the ECU for a diagnostic trouble code via the fault diagnosis apparatus, the ECU reads a diagnostic trouble code from the volatile memory or the nonvolatile memory and sends it to the fault diagnosis apparatus. The fault diagnosis apparatus analyzes the location, the cause, and the like of the fault in the vehicle on the basis of the diagnostic trouble code.

A technique of assuring the reliability of data stored in the volatile memory and the nonvolatile memory is disclosed in, for example, a patent document JP-A-2004-21520.

In the patent document JP-A-2004-21520, a volatile memory has a first storage area for storing data to be stored and a second storage area for storing the same data as the data to be stored, and a nonvolatile memory has a third storage area for storing the same data as the data to be stored. The ECU compares the data in the first storage area, the data in the second storage area, and the data in the third storage area and employs as correct data) the data matched in the two or more areas. In such a manner, reliability is assured.

The precondition of the technique of the above patent document is that all of data in the first storage area in the volatile memory is stored in the second storage area in the volatile memory and the third storage area in the nonvolatile memory. However, a case is expected such that data in the volatile memory is deleted due to removal of the battery or an erasure instruction from an external tool. In this case, in the above patent document, the data in the volatile memory and the data in the nonvolatile memory become inconsistent, and it is concerned that the data in the nonvolatile memory, which should not be rewritten, is erroneously rewritten.

SUMMARY OF THE INVENTION

The present invention has been achieved in view of the drawbacks and an object of the invention is to provide a memory management apparatus for a vehicle, having a volatile memory and a nonvolatile memory as a backup of the volatile memory, capable of reliably storing data to be stored while matching data in the volatile memory and data in the nonvolatile memory.

To achieve the object, the invention provides, in one aspect, a memory management apparatus for a vehicle including: a volatile memory to which power source is always supplied and having a diagnostic trouble code storage area for storing and holding a diagnostic trouble code; a nonvolatile memory having a backup area for storing the same code as the diagnostic trouble code; and a storage control unit, when a fault is detected in a predetermined object to be detected in a vehicle, for storing the diagnostic trouble code indicative of the detected fault (hereinbelow, called as a determined diagnostic trouble code) into the diagnostic trouble code storage area, and storing the determined diagnostic trouble code (hereinbelow, called as a permanent diagnostic trouble code) configured to be stored in the backup area from among the determined diagnostic trouble code into the backup area. The memory management apparatus for a vehicle is mounted on a vehicle.

In the memory management apparatus for a vehicle, the volatile memory further includes a mirror area for storing the same information as information in the backup area, and an update information storage area for storing update information indicative of a data update state in the volatile memory. The storage control unit further stores the same code as the permanent diagnostic trouble code into the mirror area, and stores the update information into the update information storage area.

The apparatus further includes a recovering unit for updating information in the mirror area or the backup area by a predetermined recovering process on the basis of the update information stored in the update information storage area so that the information in the mirror area and the information in the backup area match with each other.

In the memory management apparatus for a vehicle, update information indicative of the update state of the volatile memory is stored in the volatile memory. Consequently, the update state of the volatile memory can be known on the basis of the update information. To be concrete, it can be known that a code is newly stored in the mirror area or the diagnostic trouble code storage area, or information in the mirror area or the diagnostic trouble code storage area is deleted. Therefore, on the basis of such update information, whether the information in the mirror area and that in the backup area match or not can be estimated.

With respect to this point, in the memory management apparatus for a vehicle, the recovering unit executes a recovering process of updating information in the mirror area or the backup area on the basis of the update formation so that the information in the mirror area and that in the backup area match with each other.

As described above, in the memory management apparatus, first, the match between the mirror area and the diagnostic trouble code storage area is assured. Even when the information in the mirror area or the diagnostic trouble code storage area is updated, the information in the mirror area and that in the backup area are made identical with each other by the recovering unit. Consequently, the match between the information in the diagnostic trouble code storage area and the information in the backup area is assured. As a result, the reliability of the data in the backup area is assured.

In view of the drawbacks, the present invention provides a memory management apparatus for a vehicle, which is mounted on a vehicle, including: a volatile memory to which power source is always supplied and having a diagnostic trouble code storage area for storing and holding a diagnostic trouble code; a nonvolatile memory having a backup area for storing the same code as the diagnostic trouble code; and a storage control unit, when a fault is detected in a predetermined object to be detected in the vehicle, for storing the diagnostic trouble code indicative of the detected fault (hereinbelow, called as a determined diagnostic trouble code) into the diagnostic trouble code storage area, and storing the determined diagnostic trouble code (hereinbelow, called as a permanent diagnostic trouble code or a permanent fault code) configured to be stored in the backup area from among the determined diagnostic trouble codes into the backup area. The volatile memory further includes a mirror area for storing the same information as the information in the backup area. The storage control unit performs process of, when a fault is detected, storing the determined diagnostic trouble code indicative of the detected fault into the mirror area, storing the determined diagnostic trouble code in the diagnostic trouble code storage area, storing the determined diagnostic trouble code as the permanent diagnostic trouble code into the backup area, and further performs process of, as a recovery process, when it is determined on the basis of the information in the mirror area, the diagnostic trouble code storage area, and the backup area that the information in the mirror area and the information in the backup area do not match with each other and a latest determined diagnostic trouble code (hereinbelow, called as the latest code) among the determined diagnostic trouble codes in the mirror area is stored in the diagnostic trouble code storage area, storing the latest code into the backup area, and, when it is determined that the information in the mirror area and the information in the backup area do not match with each other and the latest code in the mirror area is not stored in the diagnostic trouble code storage area, storing the latest code in both of the diagnostic trouble code storage area and the backup area.

With the configuration, when mismatch occurs in data between the areas, the data in the mirror area updated first is employed, and the data in the other two diagnostic trouble code storage areas and the backup area is updated by the employed data.

More specifically, for example, even if the memory management apparatus for a vehicle is reset at the time point when only the data in the mirror area is updated first, the data in the mirror area will not be updated back to the old data same as that in the other two diagnostic trouble code storage areas and the backup area. To the contrary the old data in the diagnostic trouble code storage area and the backup area is updated to the new data in the mirror area.

BRIEF DESCRIPTION OF THE DRAWINGS

Other objects, features and advantages of the present invention will become more apparent from the following detailed description made with reference to the accompanying drawings, in which:

FIG. 10 is a time chart explaining an operation of the second embodiment;

FIG. 11 is another time chart explaining an operation of the second embodiment;

FIG. 12 is yet another time chart explaining an operation of the second embodiment; and FIG. 13 is still yet another time chart explaining an operation of the second embodiment.

DETAILED DESCRIPTION

Embodiments of the present invention will be described below with reference to the drawings.

First Embodiment

Figure 1:
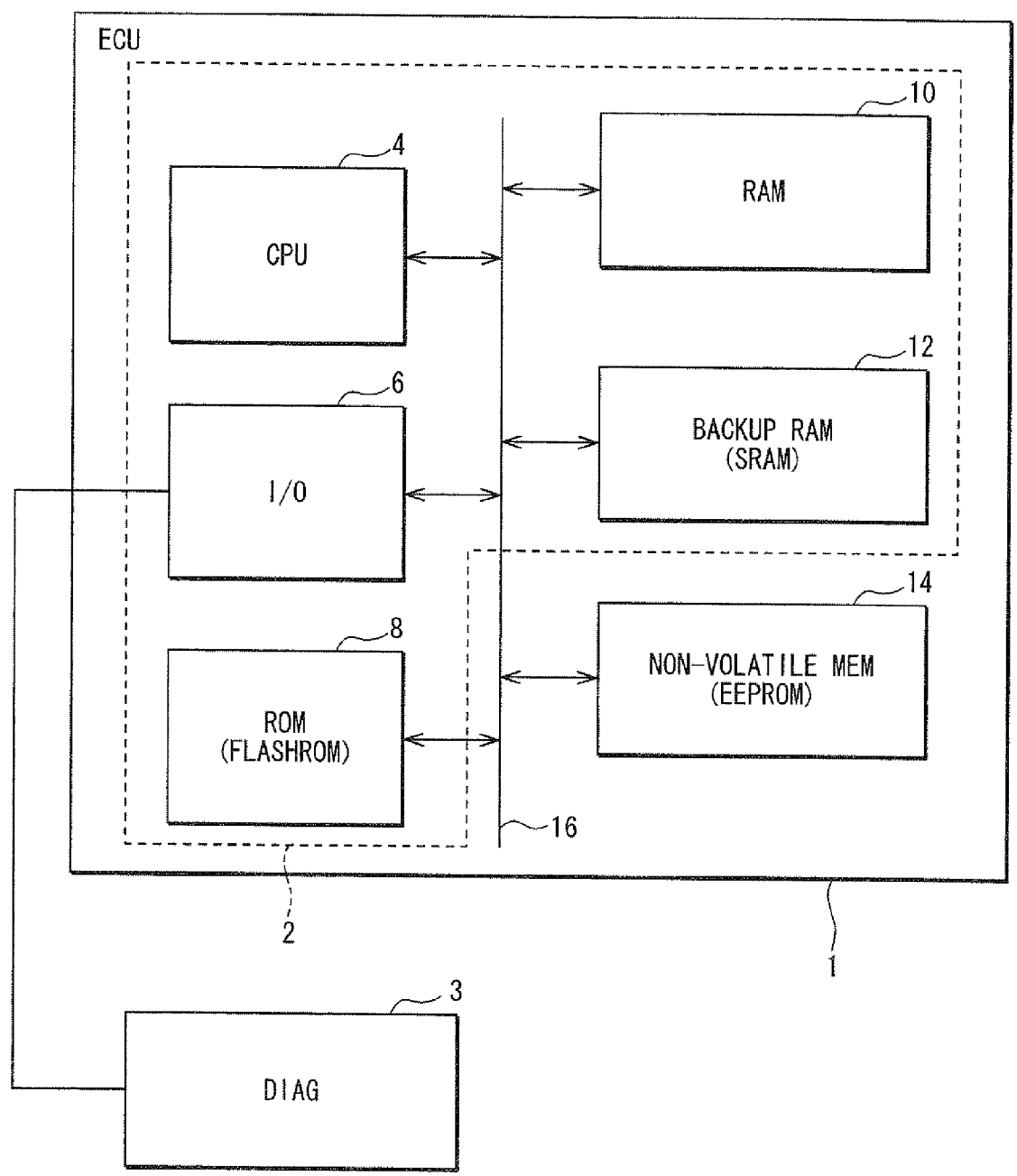
FIG. 1 is a configuration diagram of an electronic control unit (ECU) in an embodiment of the present invention.

FIG. 1 is a configuration diagram of an electronic control unit (hereinbelow, called ECU) 1 to which the present invention is applied. The ECU 1 is mounted on a vehicle (not shown) and controls the parts in the vehicle.

The ECU 1 has a microcomputer 2 and an EEPROM 14 as a nonvolatile memory. The EEPROM 14 is connected to the microcomputer 2 so that data can be transferred/received to/from each other via a bus 16 and a not-shown predetermined interface.

The microcomputer 2 has a CPU 4 for executing various processes in accordance with a predetermined program, a ROM 8 in which a program or the like executed by the CPU 4 is stored, a RAM 10 for storing information such as a computation result of the CPU 4, a backup RAM (hereinbelow, called as an SRAM) 12 to which voltage is always supplied from a not-shown battery of the vehicle and capable of holding data while the voltage is supplied, an interface (I/O) 6 for connecting to an external electronic device, and the bus 16 for interconnecting those components.

The CPU 4 operates according to a program for trouble diagnosis stored in the ROM 8 and detects the presence or absence of a fault in a vehicle. When a fault is detected, a diagnostic trouble code (DTC) indicative of the fault is stored in the SRAM 12 and the EEPROM 14. Concretely, the trouble code is stored in the SRAM 12 and the same code as the trouble code stored in the SRAM 12 is stored as a permanent diagnostic trouble code (PDTC) into the EEPROM 14. The diagnostic trouble code stored in the SRAM 12 will be called as a DTC. Particularly, the diagnostic trouble code stored in the EEPROM 14 will be called as a PDTC.

According to the law, the PDTC has to be stored in the EEPROM 14. Concretely, after the DTC is stored in the SRAM 12, by the end of an ignition cycle (a period between turn-on of an ignition switch of the vehicle and turn-off or between turn-off of the ignition switch and turn-on), the same code (PDTC) as a predetermined DTC in the DTC has to be stored in the EEPROM 14.

A state diagnostic apparatus 3 is an apparatus for obtaining a diagnostic trouble code from the ECU 1 and making a state diagnosis of a vehicle on which the ECU 1 is mounted. The state diagnostic apparatus 3 is connected to the microcomputer 2 in the ECU 1 via the I/O 6. More concretely, for example, in a repair shop or dealer shop, a repair person or the like communicatively connects the state diagnostic apparatus 3 to the ECU 1.

When a transmission request of the diagnostic trouble code is received from the state diagnostic apparatus 3, the ECU 1 reads the DTC stored in the SRAM 12 and transmits the read DTC to the state diagnostic apparatus 3. In the case where the DTC stored in the SRAM 12 is lost when the battery of the vehicle is removed and no voltage is supplied to the SRAM 12 or when a failure occurs in the ECU 1 and the ECU 1 and the SRAM 12 are initialized, by writing the PDTC stored in the EEPROM 14 into the SRAM 12, the data in the SRAM 12 is restored.

Figure 2:
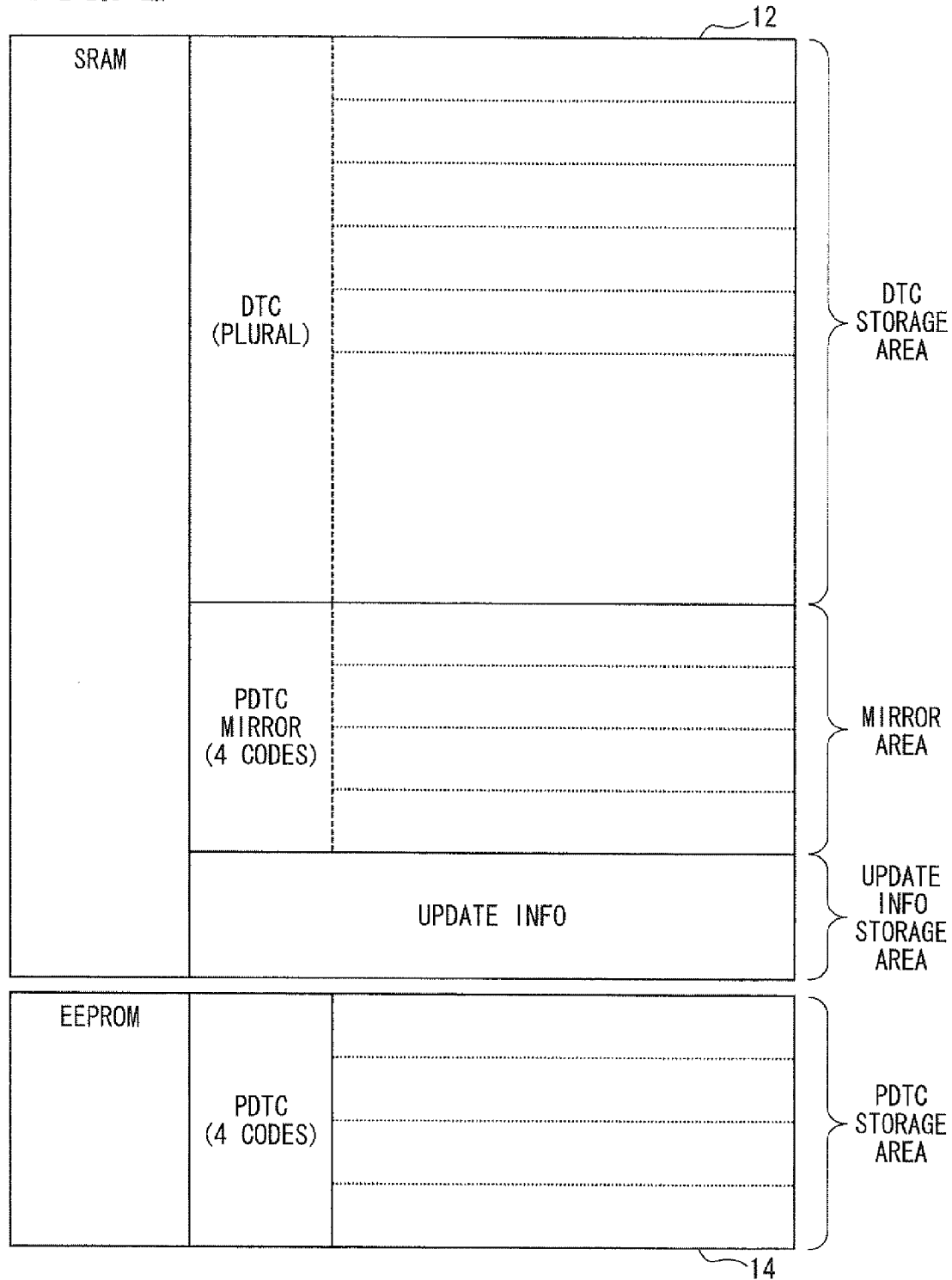
FIG. 2 is a diagram showing a storage configuration of an SRAM and an EEPROM.

FIG. 2 is a diagram showing the configuration of a storage area in the SRAM 12.

As shown in FIG. 2, the SRAM 12 has an area for storing a DTC (hereinbelow, called DTC storage area), an area for storing a copy (mirror) of a PDTC (hereinbelow, called as a mirror area), and an area for storing update information indicative of an update state of the SRAM 12 (hereinbelow, called as an update information storage area).

The EEPROM 14 has an area for storing a PDTC (hereinbelow, called as a PDTC storage area).

More specifically, the DTC storage area has a plurality of (for example, five or more) storage areas each storing only one DTC. The PDTC storage area has four storage areas each storing only one PDTC. The structure is based on the law that it is sufficient to store four PDTCs in the EEPROM 14. The mirror area has the same configuration as that of the PDTC storage area. Concretely, the mirror area has four storage areas each storing only one mirror of the PDTC. In the embodiment, as the details will be described later, by copying the information in the mirror area to the PDTC storage area, or by copying the information in the PDTC storage area to the mirror area, the information in both of the areas is made to be consistent.

Figure 3:
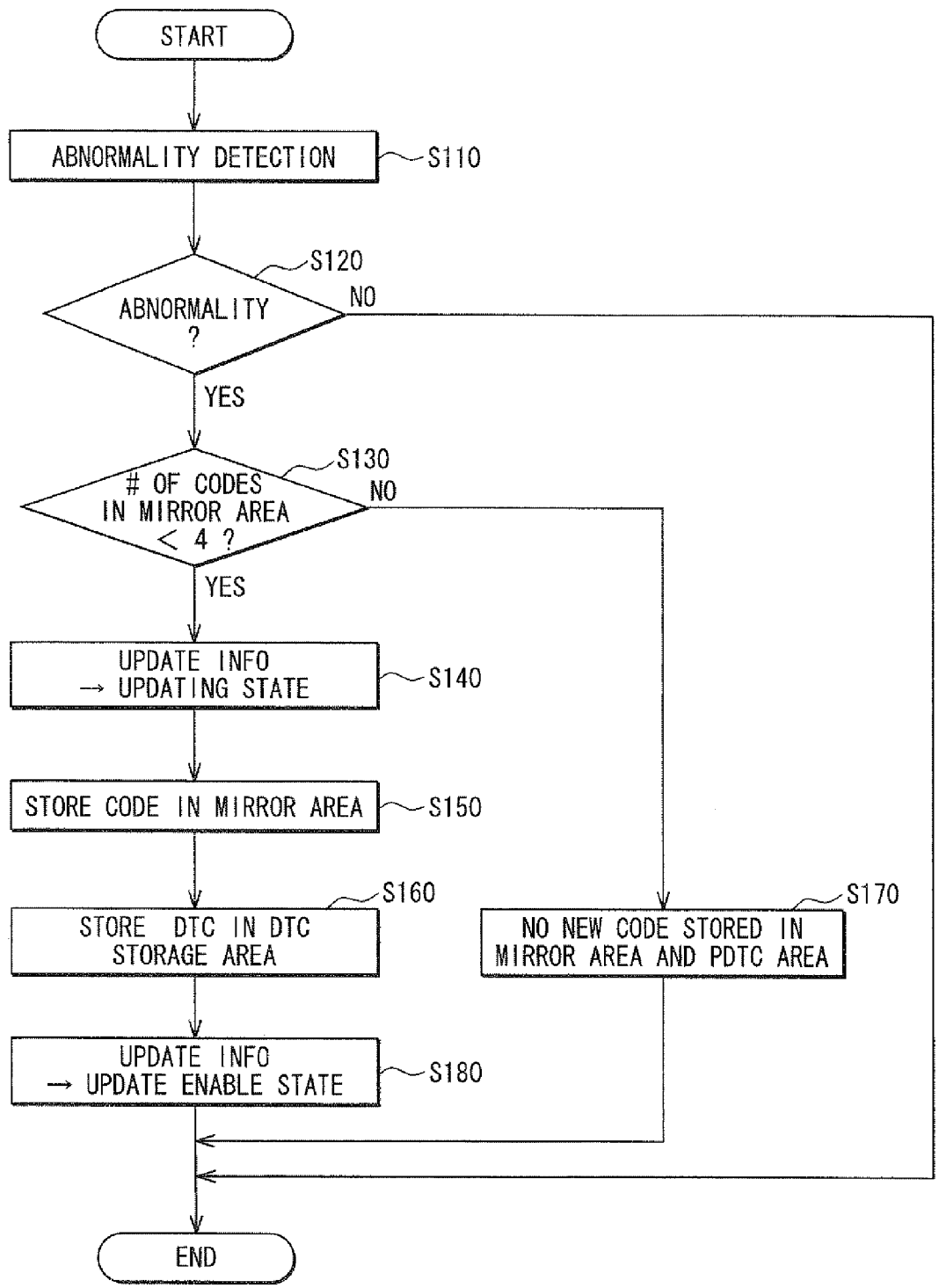
FIG. 3 is a flowchart showing an abnormality detecting process executed in the ECU.

FIG. 3 is a flowchart showing the flow of an abnormality detecting process executed by the CPU 4 in the microcomputer 2.

In the abnormality detecting process, first, in S110, the abnormality detecting process is started and whether a predetermined object to be detected is abnormal (faulty) or not is detected. In S120, whether there is abnormality or not is determined on the basis of the result of detection in S110. When no abnormality is determined (NO in S120), the process is finished.

On the other hand, when it is determined in S120 that there is abnormality (YES in S120), in S130, whether the number of codes stored in the mirror area is smaller than four or not is determined.

When it is determined in S130 that the number is not smaller than four (NO in S130), determination is made that it is unnecessary to newly store a code in the mirror area (and the PDTC storage area). In S170, the DTC which is detected abnormal this time (i.e., in the current processing) is stored in the DTC storage area. After that, the process is finished.

On the other hand, when it is determined in S130 that the number of codes in the mirror area (YES in S130) is smaller than four, it is determined that the DTC detected to be abnormal this time is to be stored in the PDTC storage area (and the mirror area). In S140, first, the state of update information is changed to an updating state. The "updating state" denotes a state where a predetermined code is being stored in the mirror area and the DTC storage area.

In S150, the mirror of the DTC determined to be stored in the PDTC storage area (and the mirror area) is stored into the mirror area.

In S160, the DTC detected abnormal this time is stored in the DTC storage area.

In S180, the state of the update information is changed to an update enable state. The "update enable state" denotes a state in which updating of the mirror area and the DTC storage area has been completed and information in the mirror area may be copied to the PDTG storage area. After S180, the process is finished.

Figure 4:
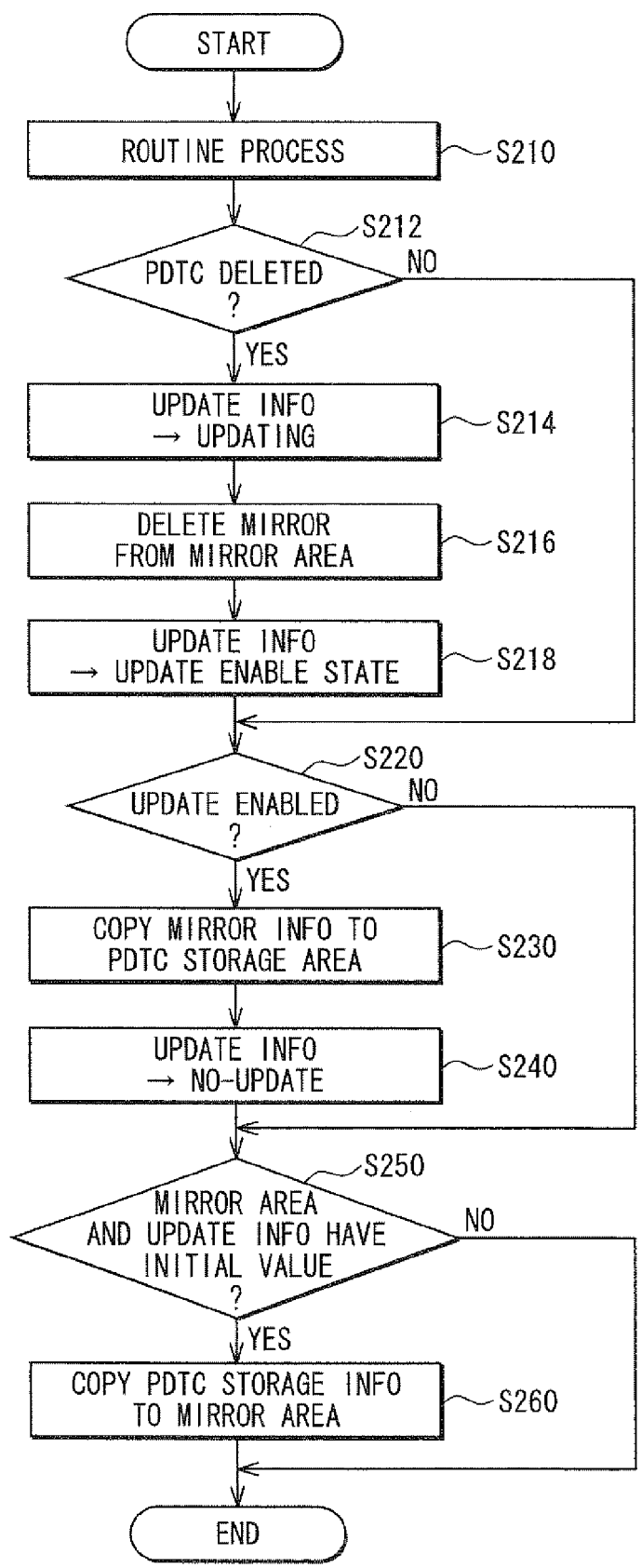
FIG. 4 is a flowchart showing a routine process executed in the ECU.

FIG. 4 is a flowchart showing a routine process periodically executed by the CPU 4 in the microcomputer 2.

In the process, the routine process is started in S210, and the program advances to S212.

In S212, whether the PDTG in the PDTC storage area is to be deleted or not is determined. In the process, for example, when it is determined that the apparatus has normally recovered from a failure indicated by the PDTC in a plurality of trip periods (or ignition cycles, each of which is a period from turn-on to turn-off of the ignition switch of the vehicle or a period between turn-on and the next turn-on of the ignition switch of the vehicle), the apparatus follows the law that the PDTC in the normal determination may be deleted from the EEPROM 14. Specifically, whether the PDTC is deleted or not is determined on the basis of whether normal determination is performed in the plurality of trip periods with respect to a predetermined trouble. When the normal state is determined in the plurality of trip periods, it is determined that the PDTC related to the normal-state determination is deleted from the EEPROM 14.

When a decision is made to delete the PDTC in S212 (YES in S212), the program advances to S214 where update information is changed to the update state.

In S216, a mirror in the mirror area, corresponding to the PDTC to be deleted is deleted.

In S218, the update information is changed to the update enable state. After S218, the program advances to S220. Also when it is determined in S212 that the PDTC is not deleted (NO in S212), the program advances to S220.

In S220, whether the update information can be updated or not is determined. When it is determined that the update information can be updated (YES in S220), the program advances to S230 where the information in the mirror area is copied to the PDTC storage area. In such a manner, the information in the mirror area and that in the PDTC storage area become the same.

In S240, the state of the update information is changed to a no-update state. The "no-update state" denotes a state in which the mirror area and the DTC storage area are not updated after the mirror area and the PDTC storage area are matched. In other words, it means that the matching between the mirror area and the PDTC storage area is maintained.

After S240, the program advances to S250. Also when it is determined in S220 that updating of the update information is not enabled (NO in S220), the program also advances to S250.

In S250, whether or not both of the information in the mirror area and the update information have initial values is determined. For example, when the battery of the not-shown vehicle is removed, the supply of power to the SRAM 12 is interrupted, and both of the information in the mirror area and the update information become the initial values.

When it is determined that both of the information in the mirror area and the update information have the initial values (YES in S250), the program advances to S260 where the information in the PDTC storage area is copied to the mirror area. After that, the process is finished.

On the other hand, when it is determined in S250 that both of the information in the mirror area and the update information are not initial values (NO in S250), the process is finished.

Figure 5:
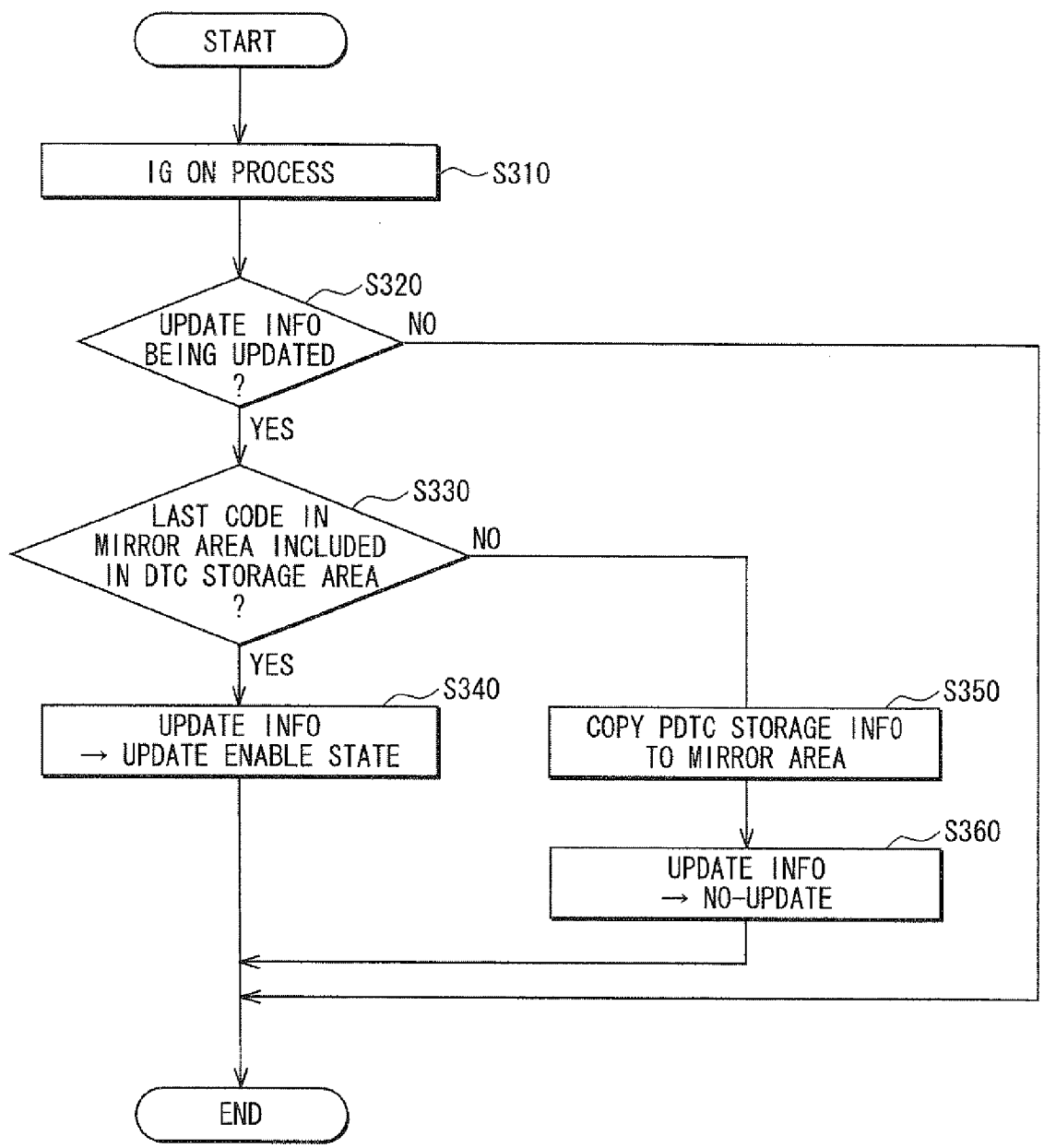
FIG. 5 is a flowchart showing an ignition switch power-on process executed in the ECU.

FIG. 5 is a flowchart showing process executed at power-on of an ignition switch (IG), by the CPU 4 of the microcomputer 2.

The process starts when the ignition switch of the vehicle is turned on or when the ECU 1 is reset (initialized). The information in the SRAM 12 is held as long as the not-shown battery for always supplying voltage to the SRAM 12 is not removed.

First, the process at power-on of the ignition is started in S310, and the program advances to S320 where a determination is made to see whether the update information is being updated or not.

When it is determined in step S320 that the update information is not being updated (NO in S320), it is determined that the update information is in the update enable state or the no-update state. In other words, a determination is made that updating (updating of the mirror area and the DTC storage area) before the ignition switch was turned off last time was finished normally or was not performed, thereby simply finishing the process.

On the other hand, when it is determined in S320 that the update information is being updated (YES in S320), it is determined that the updating before the ignition switch was turned off last time was not finished normally, and the program advances to S330. In S330, the last code in the mirror area, in other words, the latest code in the storage period is included in the DTC storage area or not is determined.

When it is determined in S330 that the latest code in the storage period in the mirror area is included in the DTC storage area (YES in S330), it is determined that the updating before the ignition switch is turned off last time has been finished normally. The program advances to S340 where the update information is changed to the update enable state. After that, the process is finished.

On the other hand, when it is determined in S330 that the latest code in the storage period in the mirror area is not included in the DTC storage area (NO in S330), the program advances to S350 where the information in the PDTC storage area is copied to the mirror area.

Then, the program advances to S360 and the update information is changed to the no-update state. After that, the process is finished.

Figure 6:
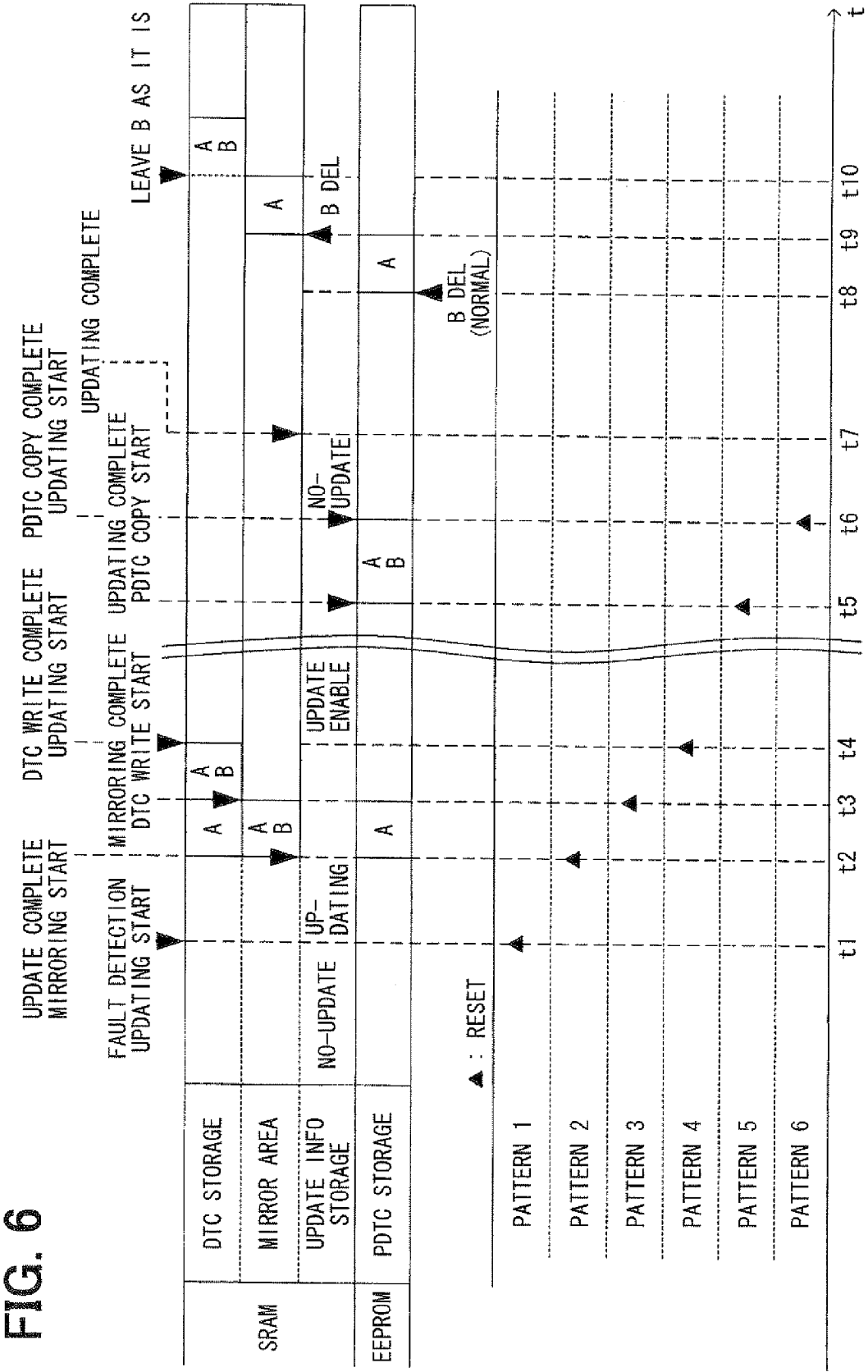
FIG. 6 is a time chart showing an operation in the embodiment.

FIG. 6 is a time chart for explaining an operation of the embodiment.

FIG. 6 shows storing modes in the DIC storage area, the mirror area, and the update information storage area in the SRAM 12 and the PDTC storage area in the EEPROM 14. With reference to FIG. 6, the relations between the storing modes in the DTC storage area, the mirror area, the update information storage area, and the PDTC storage area and the reset timings will be described.

The reset denotes initialization of the ECU 1 performed when some abnormality occurs in the ECU 1, and includes a manual reset. In the ECU 1 of the embodiment, the mirror area and the PDTC storage area are made consistent with each other at any reset timing. The description will be given below.

It is assumed that "A" is stored as the DTC in the DTC storage area and the same "A" as that in the DTC storage area is stored in the mirror area. "A" is stored also in the PDTC storage area. It is also assumed that "no-update state" is stored as update information in the update information storage area. In the following description, the process is performed mainly by the microcomputer 2 (more concretely, the CPU 4) of the ECU 1.

Next, an operation will be described concretely. When a fault occurs in a predetermined object to be detected, the fault is detected (time t1, S110→S120 (YES)). The DTC indicative of the fault detected at time t1 is expressed as "B". Since the number of codes stored in the mirror area is one (YES in S130), the update information is changed to the "updating state" (S140).

It is now assumed that reset is made before completion of the process of changing the update information to the "updating state" (pattern 1). That is, the update information remains in the "no-update state".

After occurrence of the resetting (after the initializing process is finished), the process at power-on of the ignition switch starts. In the process, it is determined that the update information is not in the "updating state" (more specifically, "no-update state") (NO in S320). In this case, the ignition switch power-on process is simply finished.

In the routine process executed after that, it is determined that the update information is not in the "update enable state" (NO in S220) and it is determined that the information in the mirror area and the update information are not the initial values (NO in S250). Further, it is determined that the PDTC is not deleted (NO in S270), and the routine process is simply finished.

As described above, in the pattern 1, the information in the mirror area and the PDTC storage area remains as it is (that is, only "A" is stored), and the consistency is maintained.

Referring again to FIG. 6, after the process of rewriting the update information to the "updating state" (time t2, S140), "B" as a DTC indicative of the fault detected this time is stored in the mirror area (S150).

It is assumed that a reset occurs before completion of the process of storing "B" in the mirror area (pattern 2). That is, "B" is not stored yet in the mirror area. In this case, in the ignition switch power-on process, the update information is determined as "updating" (YES in S320). In the process of determining whether the latest new code (in this case, "A") in the storage period in the mirror area is stored in the DTC storage area or not, it is determined that the new code is stored (YES in S330), the update information is changed to the "update enable state" (S340).

In the routine process executed after that, it is determined that the update information is in the "update enable state" (S220), and the information in the mirror area is copied to the PDTC storage area. Concretely, "A" in the mirror area is copied to the PDTC storage area. As a result, the mirror area and the PDTC storage area are made to be consistent with each other again.

Referring again to FIG. 6, after completion of storage of "B" to the mirror area, "B" is stored into the DTC storage area (time t3, S160).

It is now assumed that resetting occurs before completion of the process of storing "B" in the DTC storage area (pattern 3). That is, "B" is not stored yet in the DTC storage area.

In this case, in the ignition switch power-on process, the update information is determined as "updating state" (YES in S320). In a process of determining whether the latest code in the storage period in the mirror area (in this case, "B") is stored in the DTC storage area or not, it is determined that the latest code is not stored (NO in S330), and the information in the PDTC storage area is copied to the mirror area. As a result, although "B" is once stored in the mirror area, the information in the mirror area becomes the same as that in the PDTC storage area, so that the PDTC storage area and the mirror area are made to be consistent with each other. The update information is changed to the "no-update state" (S360).

In the routine process executed after that, it is determined that the update information is not in the "update enable state" (NO in S220) and that the information in the mirror area and the update information are not initial values (NO in S250). Further, it is determined that the PDTC is not deleted (NO in S270), and the routine process is simply finished.

Referring again to FIG. 6, after completion of the process of storing "B" in the DTC storage area, the update information is changed to the "update enable state" (time t4, S180).

It is assumed that resetting occurs before completion of the process of changing the update information to the "update enable state" (pattern 4). That is, the update information is in the "updating state".

In this case, in the ignition switch power-on process, it is determined that the update information is in the "updating state" (YES in S320). In the process of determining whether the latest code in the storage period in the mirror area (in this case, "B") is stored in the DTC storage area or not, it is determined that the latest code is stored (YES in S330), and the update information is changed to the "update enable state" (S340).

In the routine process which is executed after that, it is determined that the update information is in the "update enable state" (YES in S220), and the information in the mirror area is copied to the PDTC storage area (S230). Simultaneously, the update information is changed to the "no-update state" (S240). When it is determined that the information in the mirror area and the update information are not the initial values (NO in S250), it is determined that the PDTC is not deleted (NO in S270), and the routine process is simply finished.

Even when the update information is not in the "update enable state", the information in the mirror area is copied to the PDTC storage area only on a condition that the mirror area and the DTC storage area are normally updated. As a result, the mirror area and the PDTC storage area are made to be consistent with each other, and, moreover, the DTC storage area and the PDTC storage area are made to be consistent with each other.

Referring again to FIG. 6, after completion of the process of changing the update information to the "update enable state" (time t5 and S180), in the following routine process, the information in the mirror area is copied to the PDTC storage area (time t5, S230).

It is assumed that resetting occurs before completion of the process of copying the information in the mirror area to the PDTC storage area (pattern 5).

In this case, the ignition switch power-on process is similar to that in the pattern 4. The routine process is also similar to that in the pattern 4.

That is, in other words, even if resetting occurs during the operation of copying the information in the mirror area to the PDTC storage area, after that, the information in the mirror area is copied to the PDTC storage area in the ignition switch power-on process and the routine process, and the consistency between the areas is obtained.

Referring again to FIG. 6, after completion of the process of copying the information in the mirror area to the PDTC storage area (time t6, S230), the update information is changed to the "no-update state" (S240).

It is now assumed that resetting occurs before completion of the process of changing the update information to the "no-update state" (pattern 6). The update information remains in the "update enable state".

In this case, in the ignition switch power-on process, it is determined that the update information is not in the "updating state" (NO in S320), and the ignition switch power-on process is finished. In the following routine process, the program advances from S212 (NO) to S220. In S220, it is determined that the update information is in the "update enable state" (YES in S220), and the information (A and B) in the mirror area is copied to the PDTC storage area. The update information is changed to the "no-update state" (S240), the program advances to S250 (NO), and the routine process is finished. In the example of FIG. 6, the process of setting the update information in the "no-update state" is completed at time t7.

It is assumed that the normal state is determined with respect to the fault expressed by "B" of the DTC (or PDTC) (time t8). The normal state is determined when the apparatus is recovered from a predetermined fault to the normal state in a plurality of trip periods.

In this case, deletion of "B" from the PDTC storage area is determined (YES in S270), and "B" in the PDTC storage area is deleted (time t8 to t9, S280). From the mirror area, the mirror of "B" (the same "B") is deleted (time t9 to t10, S280). The DTC storage area remains as it is (that is, "B" remains stored). In the example, the number of codes in the DTC storage area and that in the PDTC storage area do not always coincide with each other. However, the same code as the PDTC in the PDTC storage area is included in the DTC storage area, so that the consistency is maintained.

FIGS. 10 to 13 are diagrams illustrating an operation in the embodiment more specifically.

Figure 10:
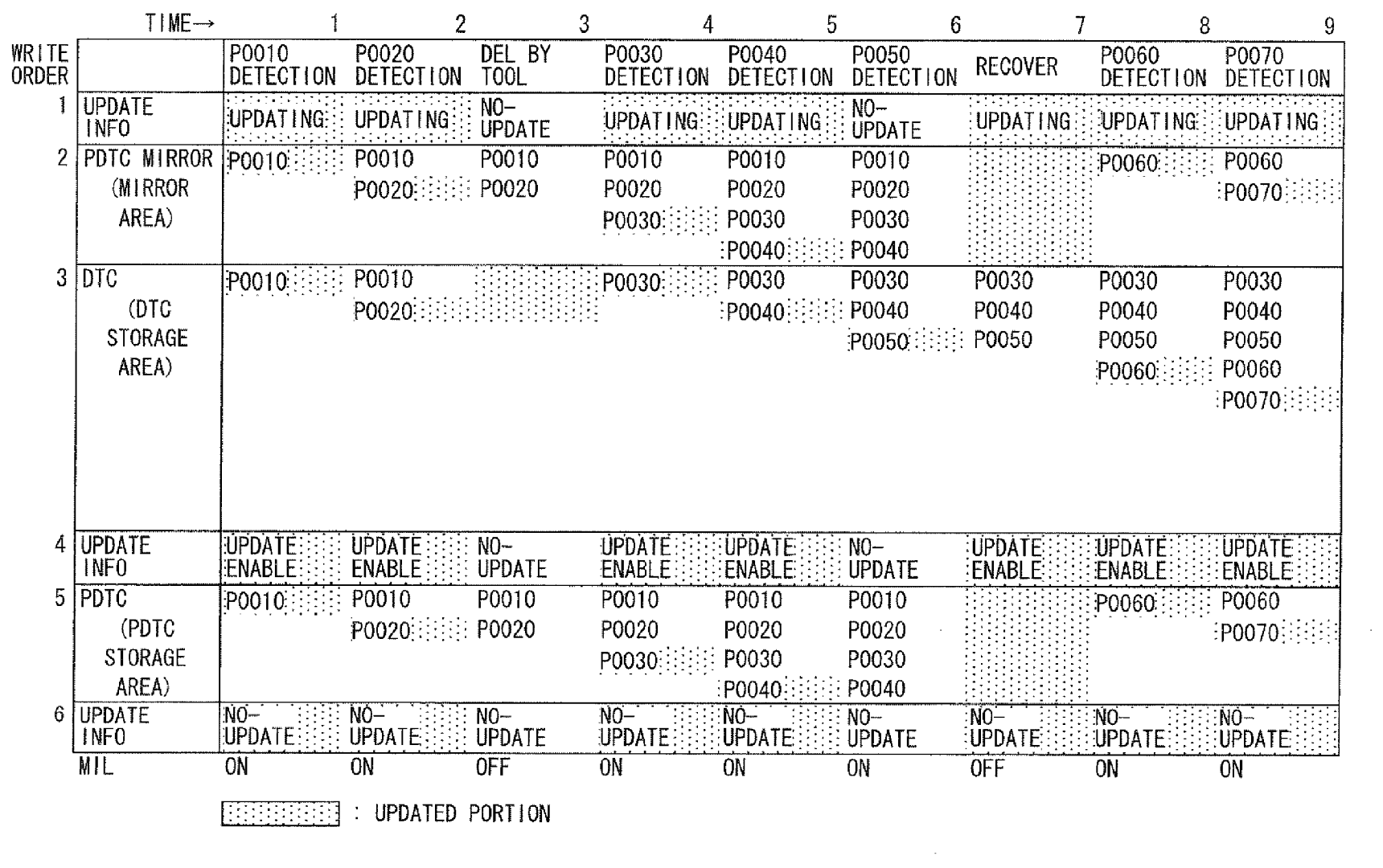
Figure 11:
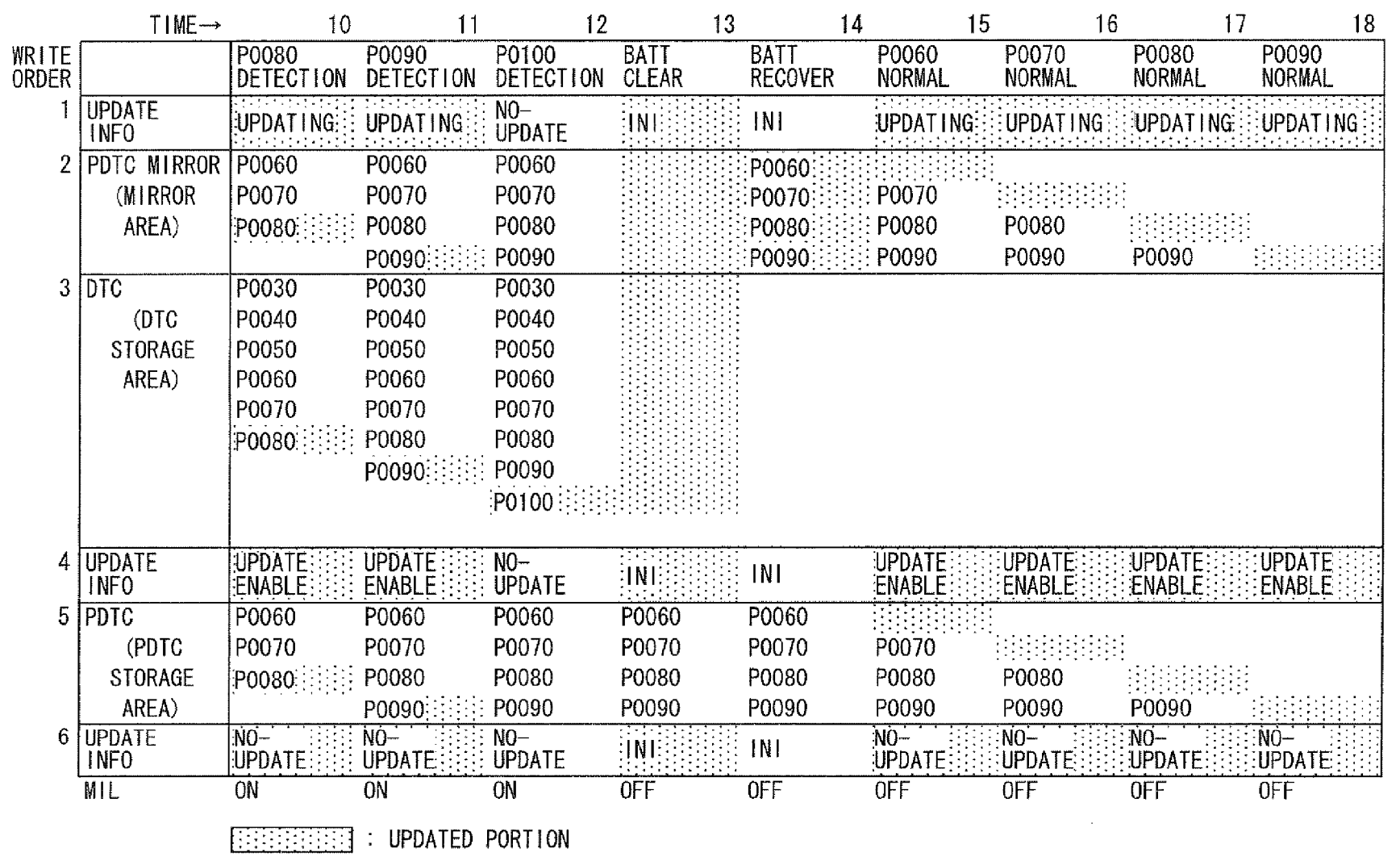

More practically, FIGS. 10 and 11 are diagrams showing a data storage mode, and FIGS. 12 and 13 are diagrams showing a data storage mode (recovery mode) when resetting occurs.

In FIGS. 10 and 11, the horizontal axis indicates time series (i.e., numbered as 1 to 18 on top of the list), and the vertical axis shows items indicative of codes (storage areas) in information writing order when a fault is detected. Specifically, when a fault is detected, as described above, information is written in the following order, 1. Update information, 2. Permanent diagnostic trouble code mirror (mirror area), 3. Diagnostic trouble code: DTC (DTC storage area), 4. Update information, 5. Permanent diagnostic trouble code: PDTC (PDTC storage area), and 6. Update information, P0010 to P0090 express diagnostic trouble codes. MIL denotes an alarm lamp for notifying the user or the like of an abnormality or fault. In the following, for convenience of explanation, the time series will be expressed as time series 1, time series 2, and so on.

In FIG. 10, when a fault (DTC: P0010) is detected in time series 1 (S110, YES in S120, and YES in S130), the update information is rewritten to the "updating state" (S140), P0010 is stored in the mirror area (S150), P0010 is stored in the DTC storage area (S160), and the update information is rewritten to the "update enable state" (S180). In the following routine process (FIG. 4), the information in the mirror area is copied to the PDTC storage area (YES in S220→S230) and the update information is rewritten to the "no-update state" (S240). The operation in the time series 2 is similar to the above.

It is assumed that the information in the DCT storage area is deleted by an external tool (for example, the state diagnostic apparatus 3, refer to FIG. 1) in time series 3. In this case, the information in the other storage areas remains the same.

In time series 4, when a fault (DTC: P0030) is detected, in a manner similar to the time series 1 described above, information is stored and updated. In the time series 4, as shown in FIG. 10, P0010, P0020, and P0030 are stored in the mirror area and the PDTC storage area, only P0030 is stored in the DTC storage area (for the reason that the information in the DTC storage area was deleted in the time series 3).

In time series 5, when a fault (DTC: P0040) is detected, P0010, P0020, P0030, and P0040 are stored in the mirror area and the PDTC storage area, and P0030 and P0040 are stored in the DTC storage area.

In time series 6, when a fault (DTC: P0050) is detected, since the number of codes stored in the mirror area is four (NO in S130), P0050 is stored only in the DTC storage area (S170). In this case, the update information and the information in the PDTC storage area is stored (with respect to the PDTC storage area, NO in S212 in FIG. 4, NO in S220, and NO in S250).

In time series 7, when normal state determination indicating that the apparatus has recovered to the normal state in a 3-trip period is made (YES in S212), the update information is rewritten to the "updating state" (5214), the information in the mirror area is deleted (S216), the update information is rewritten to the "update enable state" (S218), and the information in the mirror area is copied to the PDTC storage area (S230). That is, the information in the PDTC storage area is deleted. The update information is rewritten to the "no-update state" (S240).

In time series 8, when a fault (DTC: P0060) is detected, in a manner similar to the time series 1 described above, information is stored and updated. In the time series 8, as shown in FIG. 10, P0060 is stored in the mirror area and the PDTC storage area, and P0030, P0040, P0050, and P0060 are stored in the DTC storage area.

In each of time series 9 to 11 (also refer to FIG. 11), in a manner similar to the time series 1 described above, information is stored and updated.

In FIG. 11, when a fault is detected in time series 12, in a manner similar to the time series 6 described above, information is stored and updated.

In time series 13, when the battery of the vehicle is removed (the battery clear), all of the information in the SRAM 12 is deleted. That is, all of the information in the mirror area and the DTC storage area is deleted, and the update information becomes the initial value. The information in the PDTC storage area remains the same.

In time series 14, when the battery is recovered (connected), the information in the PDTC storage area is copied as it is to the mirror area (NO in S320, NO in S220, YES in S250, and S260).

In time series 15, when normal-state determination that recovery from P0060 to the normal state is determined, it is determined to delete P0060 (YES in S212), the update information is rewritten to the "updating state" (S214), P0060 in the mirror area is deleted (S216), the update information is rewritten to the "update enable state" (S218), the information in the mirror area is copied to the PDTC storage area (S230), and the update information is rewritten to the "no-update state" (S240).

The time series 16 to 18 are similar to the time series 15.

Description will now be given with reference to FIGS. 12 and 13. The time series numbered as 1 to 18 in FIGS. 12 and 13 correspond to those in FIGS. 10 and 11.

In FIG. 12, in the time series 1, when a reset is made immediately after the update information is rewritten from the "no-update state" to the "updating state" in the writing order 1, a recovery is made as if there was no rewriting process. That is, the update information becomes "no-update state" (YES in S320, NO in S330, (S350), and S360). In the time series 1, when a reset is made immediately after P0010 is written in the mirror area in the writing order 1, a recovery is made as if there was no writing process (YES in S320, NO in S330, S350, and S360).

In the time series 2 (it is assumed that P0010 is already stored), in the writing order 1, when a reset is made immediately after the update information is rewritten from the "no-update state" to the "updating state", a recovery is made as if there was no rewriting process (S360). When a reset is made immediately after P0020 is written in the mirror area, a recovery is made as if there was no writing process (S350). The time series 4 and 5 are similar to the above. The time series 3 and 6 are as described above with reference to FIG. 10, and the description will not be repeated here.

In time series 7, when normal state determination indicating that the apparatus has recovered to the normal state in a 3-trip period is made and a reset is made immediately after the update information is rewritten from the "no-update state" to the "updating state" in the writing order 1, a recovery is made as if there was no rewriting process (S360). When a reset is made after the information in the mirror area is deleted, a recovery is made as if there was no deleting process (S360). The time series 8 to 11 are similar to the above. The time series 12 to 14 are as described above with reference to FIG. 11, and the description will not be repeated.

In time series 15, when normal state determination indicative of recovery from P0060 to the normal state is made and a reset is made immediately after the update information is rewritten from the "no-update state" to the "updating state" in the writing order 1, a recovery is made as if there was no rewriting process (S360). When a reset is made after P00060 is deleted from the mirror area, a recovery is made as if there was no deleting process (YES in S320, NO in S330, and S350). The time series 16 and 17 are similar to the above.

As described above, when a fault is detected, the ECU 1 of the embodiment stores a diagnostic trouble code indicative of the fault in the mirror area in the SRAM 12, and then stores the code in the DTC storage area. The information in the mirror area is copied in the PDTC storage area.

The mirror area has the same structure as that of the PDTC storage area. Consequently, the information in the mirror area can be easily copied to the PDTC storage area. By copying the information in the mirror area to the PDTC storage area, the information in the mirror area and that in the PDTC storage area match with each other. Moreover, the information in the DTC storage area and that in the PDTC storage area match with each other. Therefore, consistency matching between the DTC storage area and the PDTC storage area can be easily obtained.

Moreover, in the SRAM 12, an update storage area for storing update information indicative of the update state of the SRAM 12 is provided. On the basis of the update information, the ECU 1 determines that a predetermined DTC is normally stored (updated) in the mirror area and the DTC storage area, and, on the basis of the determination, the information in the mirror area is copied to the PDTC storage area. On the basis of the update information, the ECU 1 determines that a predetermined DTC is not normally stored in the mirror area and the DTC storage area (for example, updating has not been completed) and, in this case, copies the information in the PDTC storage area into the mirror area. In such a manner, the consistency between the mirror area and the PDTC storage area and the consistency between the DTC storage area and the PDTC storage area can be reliably assured. The "consistency" means in this context that, for example, a code to be stored is stored in each of the DTC storage area and the PDTC storage area, and, in other words, in at least one of the DTC storage area and the PDTC storage area, a diagnostic trouble code which should not be stored is not stored.

Further, the ECU 1 can determine the state of the SRAM 12 on the basis of the information in the mirror area and the update information more accurately as described below.

For example, when the battery for supplying voltage to the SRAM 12 is removed, all of information stored in the SRAM 12 disappears (the SRAM 12 is initialized). Consequently, if both of the information in the mirror area and the update information are initial values, removal of the battery can be determined.

When the ignition switch of the vehicle is turned off or the ECU 1 is initialized, information immediately before the ignition switch is turned off or immediately before the ECU 1 is initialized is stored in the SRAM 12. On the basis of the update information, the ECU 1 can determine whether information is being updating or not or whether updating of the information has been completed or not in the mirror area or the DTC storage area in this case.

For example, the case where an instruction of deleting the DTC is input from the state diagnostic apparatus 3 to the ECU 1 and the information in the DTC storage area is deleted can be determined. Concretely, the information in the DTC storage area is deleted by the delete instruction from the state diagnostic apparatus 3 and the information in the mirror area and the update information storage area is not deleted, so that the presence or absence of the information in each of these areas can be determined.

As described above, the ECU 1 of the embodiment can accurately grasp the state of the SRAM 12 on the basis of the update information (the information in the mirror area and the information in the DTC storage area), and the consistency between the mirror area and the PDTC storage area, and, moreover, the consistency between the DTC storage area and the PDTC storage area can be assured reliably.

In the embodiment, the processes in S140 to S180, S240, and S340 correspond to storage control unit. The processes in S230, S260, and S350 correspond to recovering unit and recovering process. In particular, the process in S230 corresponds to a first process. The process in S260 and S350 corresponds to a second process. The DTC corresponds to a diagnostic trouble code. The PDTC corresponds to a permanent diagnostic trouble code. The update information corresponds to update information and clear history information in the scope of claiming. The update information storage area corresponds to the update information storage area and the clear history storage area in the scope of claiming.

Second Embodiment

A second embodiment of the present disclosure will now be described in the following.

Only the points different from the first embodiment will be described in the following.

Figure 7:
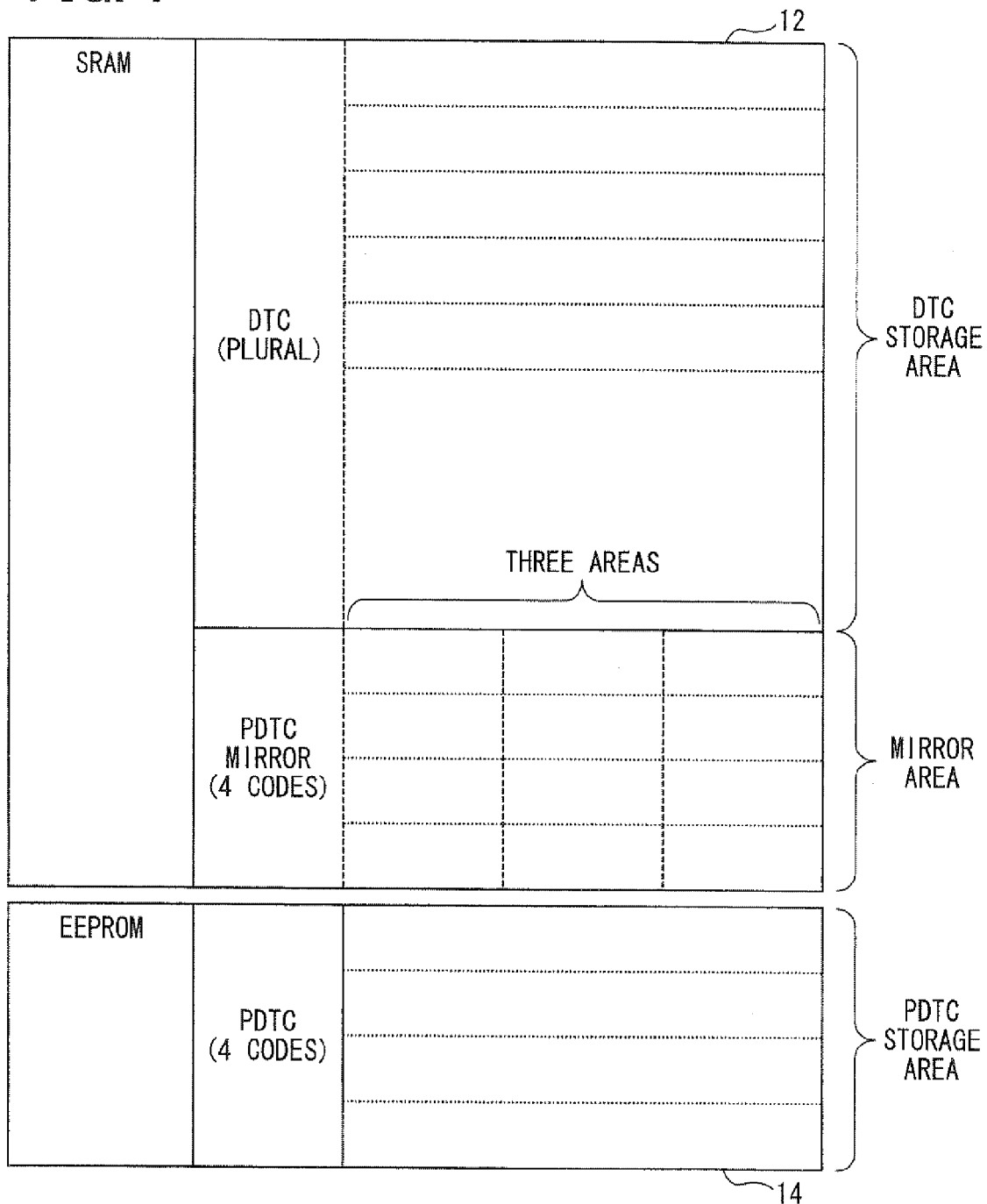
FIG. 7 is a diagram showing a storage configuration of the SRAM and the EEPROM in a second embodiment.

In the ECU 1 in the second embodiment, the storage configuration in the SRAM 12 is different from that of FIG. 2 as shown in FIG. 7. The other different points are as follows.

Figure 8:
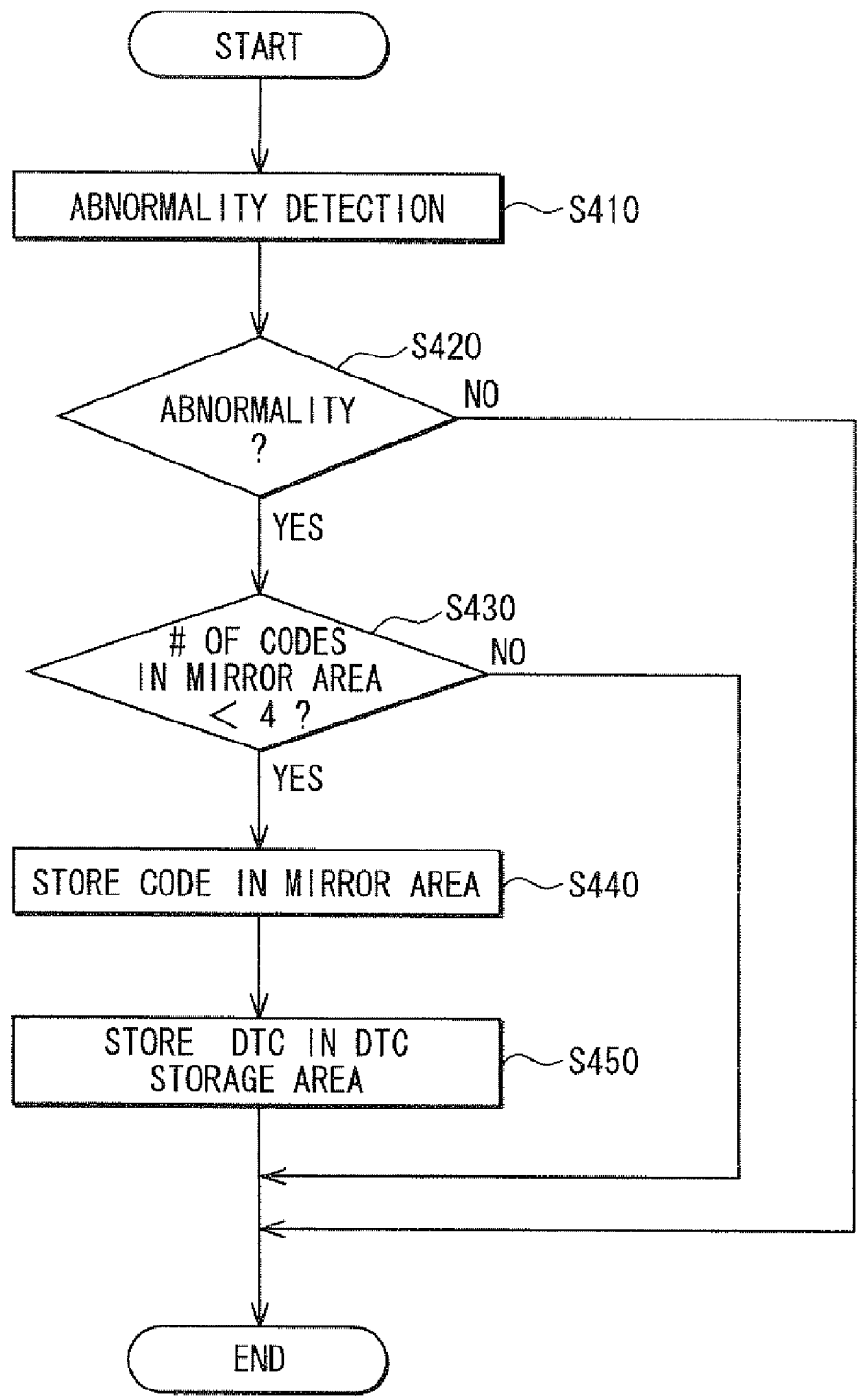
FIG. 8 is a flowchart showing abnormality detecting process executed in the ECU in the second embodiment.
Figure 9:
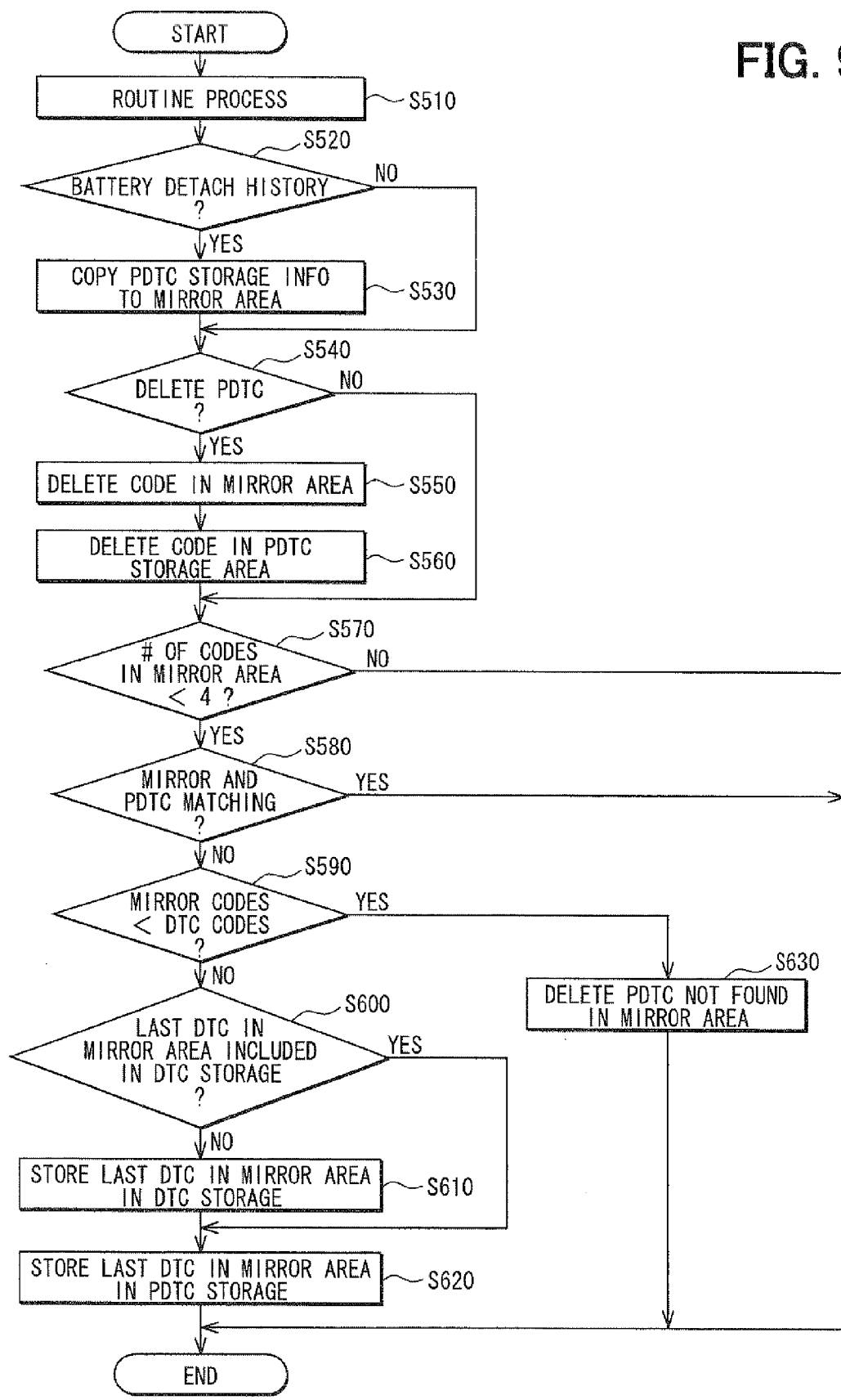
FIG. 9 is a time chart showing routine process executed in the ECU in the second embodiment.

That is, the CPU 4 in the ECU 1 executes an abnormality detecting process in FIG. 8 in place of the abnormality detecting process in FIG. 3, and executes a routine process in FIG. 9 in place of the routine process of FIG. 4. The different points will now be described in order.

FIG. 7 is a diagram showing the storage configuration in the SRAM 12 of the ECU 1 in the second embodiment which is different from the first embodiment with respect to the point that the update information storage area is not provided. In addition, the configuration of the mirror area is different.

The mirror area has, as shown in FIG. 7, three areas for storing the same data in each of storage areas, which stores only one mirror of the PDTC. That is, the three-area redundancy scheme is employed. The CPU 4 compares the data in the three areas with each other, and recognizes matching data in two or more areas as correct data. Further, for example, if there is data matched with each other in two areas, the CPU 4 recognizes the data as correct data, and rewrites the data in the remaining area to the data recognized as the correct data. Obviously, the two-area redundancy scheme may be employed, and, further, the number of areas may be more than three. Since the techniques of this kind are well-known, the description is limited to the above.

The abnormality detecting process of FIG. 8 will now be described.

First, in S410, the abnormality detecting process is started and whether an abnormality (fault) occurs in a predetermined object to be detected or not is performed. The program advances to S420 and whether there is an abnormality or not on the basis of the detection result in S410. When no abnormality is determined (NO in S420), the process is simply finished.

On the other hand, when it is determined in S420 that there is an abnormality (YES in S420), the program advances to S430 and determines whether the number of codes stored in the mirror area is smaller than four or not.

When it is determined in S430 that the number of codes is not smaller than four (NO in S430), a decision is made not to newly store a code in the mirror area (and the PDTC storage area), and the process is finished.

On the other hand, when it is determined in S430 that the number of codes is smaller than four (YES in S430), the program advances to S440 where a code (DTC) indicative of the abnormality (fault) detected this time in the current processing is stored in the mirror area.

Then, the program advances to S450 where the DTC indicative of the fault detected this time is stored also in the DTC storage area. After that, the process is finished.

In the process of FIG. 9, first, the routine process is started in S510, and the program advances to S520.

In S520, whether there is battery removal history or not, that is, whether the not-shown battery of the vehicle is removed or not is determined. In this case, a predetermined code is stored in the SRAM 12. The predetermined code is cleared (or changed) by the removal of the battery. That is, from the predetermined code, whether the battery is removed or not is known. The predetermined code corresponds to information indicative of battery removal history in claiming language.

When it is determined in S520 that there is no battery removal history (the battery is not removed) (NO in S520), the program advances to S540.

On the other hand, when it is determined in S520 that there is battery removal history (the battery is removed) (YES in S520), the program advances to S530.

In S530, the information in the PDTC storage area is copied to the mirror area and the program advances to S540.

In S540, whether the PDTC is deleted or not is determined. The determining process is the same as that in S212 in FIG. 4.

When it is determined in S540 that the PDTC is not deleted (NO in S540), the program advances to S570.

On the other hand, when it is determined in S540 that the PDTC is deleted (YES in S540), the program advances to S550.

In S550, the DTC corresponding to the PDTC to be deleted (the DTC which is the same as the PDTC) is deleted from the mirror area.

In S560, the PDTC to be deleted is deleted from the PDTC storage area. After that, the program advances to S570.

In S570, whether the number of codes stored in the mirror area is smaller than four or not is determined. When it is determined that the number of codes is not smaller than four (NO in S570), the process is simply finished.

On the other hand, when it is determined in S570 that the number of codes stored in the mirror area is smaller than four (YES in S570), the program advances to S580.

In S580, whether the information in the mirror area and that in the PDTC storage area match with each other or not is determined. When matching of the information is determined (YES in S580), the process is simply finished.

On the other hand, when it is determined in S580 that the information in the mirror area and that in the PDTC storage area do not match with each other (NO in S580), the program advances to S590.

In S590, whether or not the number of codes stored in the mirror area is smaller than that stored in the PDTC storage area is determined. When it is determined that the number of codes is smaller in the mirror area (YES in S590), the program advances to S630.

In S630, the PDTCs which are not included in the mirror area are deleted from the PDTCs in the PDTC storage area. After that, the process is finished. The process is performed on an assumption that, after deletion of a code in the mirror area in S550, the microcomputer is reset, and the process in S560 could not be executed.

On the other hand, when it is determined in S590 that the number of codes stored in the mirror area is not smaller than the number of codes stored in the PDTC storage area (NO in S590), the program advances to S600.

In S600, whether the last DTC stored in the mirror area (that is, the latest DTC) is stored also in the DTC storage area or not is determined. When it is determined that the last DTC is stored also in the DTC storage area (YES in S600), the program advances to S620.

On the other hand, when it is determined in S600 that the last DTC stored in the mirror area (the latest DTC) is not stored in the DTC storage area (NO in S600), the program advances to S610 where the latest DTC in the mirror area is stored in the DTC storage area.

In S620, the latest DTC in the mirror area is stored as the PDTC in the PDTC storage area. After that, the process is finished.

As described above, in the ECU 1 of the present embodiment, the data in the mirror area updated first is employed (trusted), and data in the other two areas of the DTC storage area and the PDTC storage area is updated with the employed data.

Consequently, for example, even if the ECU 1 is reset at the time when the data in the mirror area is updated first, the old data in the DTC storage area and the PDTC storage area is updated to the new data in the mirror area. Therefore, a consistency between the DTC storage area and the PDTC storage area can be obtained.

Moreover, since the three-area redundancy scheme is employed for the mirror area, the reliability of data in the mirror area is increased.

More practically, erroneous data such as garbage data out of data in the mirror area can be prevented from being employed. Even if data becomes erroneous, the data can be restored to the correct data. Consequently, data in the DTC storage area and the PDTC storage area can be prevented from being updated to erroneous data.

When, for example, data in the mirror area is stored in the two-area redundancy scheme and data in the two areas, data abnormality in the mirror area is determined and the recovering process is not performed. As a result, erroneous data such as garbage data is not employed, so that the size of the mirror area can be suppressed.

As described above, it is preferable to confirm whether the mirror area is normal or not prior to the execution of the recovering process that recovers the data to the DTC area and the PDTC area.

In the embodiment, the processes in S580 to S620 correspond to the recovering process in claiming language, and the processes in S520 and S530 correspond to processes of storage control unit in claiming language.

Although the present invention has been fully described in connection with the preferred embodiment thereof with reference to the accompanying drawings, it is to be noted that various changes and modifications will become apparent to those in the art.

For example, in the foregoing embodiment, an update information storage area may be provided in the EEPROM 14. It corresponds to provision of a second storage area in the non-volatile memory in the scope of claims. With the configuration, for example, even when information in the SRAM 12 is stored and the update information becomes the initial value, the update information stored in the EEPROM 14 can be referred to. Consequently, as described above with reference to FIG. 6, on the basis of the update information, the mirror area and the PDTC storage area can be made consistent with each other.

Further, in the SRAM 12, a clear history storage area (corresponding to a clear history storage area in the scope of claims) for storing clear history information indicating that predetermined information in the SRAM 12 is deleted may be provided. Furthermore, the clear history may be information showing the cause of deletion. For example, the clear history may be information showing the cause of deletion such as turn-off of the ignition switch, removal of the battery, reception of a delete instruction from an external diagnostic tool, or the like.

The configuration of providing the update information storage area in the EEPROM 14 and the configuration of providing the clear history storage area in the SRAM 12 may be combined.

In the foregoing embodiment, it is also possible to provide a plurality of mirror areas in the SRAM 12 and to store the same information in the plurality of mirror areas. For example, information in the plurality of mirror areas and that in the PDTC storage area are compared with each other. In the case of a mismatch, an abnormality is detected. It corresponds to abnormality detecting unit in the scope of claims. With the configuration, reliability of information in the PDTC storage area (and the mirror area) can be improved.

In the foregoing embodiment, it is also possible to provide a plurality of PDTC storage areas in the EEPROM 14 and to store the same information in the PDTC storage areas. For example, information in the plurality of mirror areas and that in the PDTC storage area are compared with each other. In the case of a mismatch, an abnormality is detected. It corresponds to storage abnormality detecting unit of the scope of claims. With the configuration, reliability of information in the PDTC storage area (and the mirror area) can be improved.

Further, the configuration of providing a plurality of mirror areas and the configuration of providing a plurality of PDTC storage areas may be combined.

In S330 in the foregoing embodiment, whether the code stored in the latest storage periods to the DTC storage area is stored in the mirror area or not may be determined.

Such changes and modifications are to be understood as being within the scope of the present invention as defined by the appended claims.

What is claimed is:

1. A memory management apparatus for a vehicle that is disposed in a vehicle, the apparatus comprising:
   a volatile memory arranged to have a diagnostic trouble code storage area (DTC storage area), a mirror area, and an update information storage area, wherein the volatile memory is configured to be continuously supplied with power;
   a nonvolatile memory arranged to have a backup area;
   a storage control unit configured to store a detected DTC, wherein the detected DTC is indicative of a fault detected in a predetermined object to be detected in the vehicle, the storage control unit stores the detected DTC in the DTC storage area of the volatile memory, and stores the detected DTC as a permanent diagnostic trouble code (PDTC) in the backup area of the nonvolatile memory and in the mirror area of the volatile memory, the storage control unit is further configured to store an update information indicative of a data update status of the volatile memory in the update information storage area; and
   a recovering unit configured to update information in one of the mirror area and the backup area by a predetermined recovery process that is based on the update information stored in the update information storage area, so that PDTC information in the mirror area and PDTC information in the backup area are identical.

2. The memory management apparatus of claim 1, wherein the recovering unit is further configured to execute a first recovery process to copy the PDTC in the mirror area to the backup area, the recovering unit executes the first recovery process when the update information indicates that information in the mirror area and the DTC storage area are updated, and
the recovering unit is further configured to execute a second recovery process to copy the PDTC in the backup area to the mirror area, wherein the recovering unit executes the second recovery process when the update information indicates that information in at least one of the mirror area and the DTC storage area is not updated.

3. The memory management apparatus of claim 2, wherein when the update information indicates that the information in at least one of the mirror area and the DTC storage area is not updated, the recovering unit determines whether or not a latest DTC in a storage period that is stored in one of the mirror area and the DTC storage area is also stored in another area based on the information in the mirror area and the DTC storage area, and when it is determined that the latest DTC is stored in the other area, the recovering unit is further configured to execute, the first recovery process in place of the second recovery process.

4. The memory management apparatus of claim 1, wherein the nonvolatile memory is further arranged to have a second update information storage area,
the volatile memory is further arranged to include a clear history storage area to hold a clear history information, the clear history information indicates that predetermined information in the volatile memory is deleted,
the storage control unit is further configured to store the update information in the second update information storage area of the nonvolatile memory, and
when it is determined that the predetermined information in the volatile memory has been deleted on the basis of the clear history information, the recovering unit executes the first or the second recovery process based on the update information stored in the second update information storage area.

5. The memory management apparatus of claim 1, wherein the volatile memory is further arranged to include a plurality of mirror areas,
the storage control unit is further configured to store the PDTC into each of the mirror areas, and
the memory management apparatus further comprises an abnormality detecting unit configured to compare the PDTC in the mirror areas with the PDTC in the back-up area, and to detect an abnormality when information do not match.

6. The memory management apparatus of claim 1, wherein the nonvolatile memory is further arranged to include a plurality of backup areas,
the storage control unit is further configured to store the PDTC into each of the backup areas, and
the memory management apparatus further comprises a storage abnormality detecting unit configured to compare the PDTC in the back-up areas with the PDTC in the mirror area, and to detect an abnormality when information do not match.

7. The memory management apparatus of claim 1, wherein the update information is provided as an updating state to indicate a predetermined code is being stored in the mirror area and the DTC storage area, and is provided as an update enable state to indicate a state in which the update state is complete, and
the storage control unit is further configured to store the update information as the updating state in the update information storage area before the detected DTC is stored in the mirror area and the DTC storage area, and to store the update information as the update enable state after the detected DTC is stored in the mirror area and the DTC storage area.

8. The memory management apparatus of claim 7, wherein the update information is further provided as a no-update to indicate a state in which the mirror area and the DTC storage area are not updated after the mirror area and the back up area are in a matching state,
the recovering unit is further configured to execute a first recovery process to copy the PDTC in the mirror area to the backup area, when the update information in the update information storage area is provided as the update enable state, and
the storage control unit is further configured to store the update information as the no-update in the update information storage area after the first recovery process is complete.

9. The memory management apparatus of claim 8, wherein the recovering unit is further configured to execute a second recovery process to copy the PDTC in the backup area to the mirror area, when the update information indicates that information in at least one of the mirror area and the diagnostic trouble code storage area is not updated.

10. The memory management apparatus of claim 9, wherein
when the update information indicates that the information in at least one of the mirror area and the DTC storage area is not updated, the recovering unit determines whether or not a latest DTC in a storage period that is stored in one of the mirror area and the DTC storage area is also stored in another area based on the information in the mirror area and the DTC storage area, and when it is determined that the latest DTC is stored in the other area, the recovering unit is further configured to execute the first recovery process in place of the second recovery process.

11. A memory management apparatus for a vehicle that is disposed in a vehicle, the apparatus comprising:
a volatile memory configured to have a diagnostic trouble code storage area (DTC storage area), a mirror area, and an update information storage area, the volatile memory being configured to be continuously supplied with power;
a nonvolatile memory configured to have a backup area; and
a processor configured to:
store a detected DTC, the detected DTC being indicative of a fault detected in a predetermined object to be detected in the vehicle, so that the detected DTC is stored in the DTC storage area of the volatile memory, and the detected DTC is stored as a permanent diagnostic trouble code (PDTC) in the backup area of the nonvolatile memory and in the mirror area of the volatile memory;
store an update information indicative of a data update status of the volatile memory in the update information storage area; and
update information in one of the mirror area and the backup area by a predetermined recovery process that is based on the update information stored in the update information storage area, so that PDTC information in the mirror area and PDTC information in the backup area are identical.

12. The memory management apparatus of claim 11, wherein the processor is configured to:
execute a first recovery process to copy the PDTC in the mirror area to the backup area when the update information indicates that information in the mirror area and the DTC storage area are updated; and
execute a second recovery process to copy the PDTC in the backup area to the mirror area when the update information indicates that information in at least one of the mirror area and the DTC storage area is not updated.

13. The memory management apparatus of claim 11, wherein
the nonvolatile memory is further configured to have a second update information storage area,
the volatile memory is further configured to include a clear history storage area to hold a clear history information, wherein the clear history information indicates that predetermined information in the volatile memory is deleted,
the processor is further configured to store the update information in the second update information storage area of the nonvolatile memory, and
when it is determined that the predetermined information in the volatile memory has been deleted on the basis of the clear history information, the processor executes the first or the second recovery process based on the update information stored in the second update information storage area.

14. The memory management apparatus of claim 11, wherein
the volatile memory is further configured to include a plurality of mirror areas,
the processor is further configured to store the PDTC into each of the mirror areas, and
the memory management apparatus further comprises an abnormality detector is configured to compare the PDTC in the mirror areas with the PDTC in the back-up area, and to detect an abnormality when information do not match.

15. The memory management apparatus of claim 11, wherein
the nonvolatile memory is further configured to include a plurality of backup areas,
the processor is further configured to store the PDTC into each of the backup areas, and
the memory management apparatus further comprises a storage abnormality detector configured to compare the PDTC in the back-up areas with the PDTC in the mirror area, and to detect an abnormality when information do not match.

16. The memory management apparatus of claim 11, wherein
the update information is provided as an updating state to indicate a predetermined code is being stored in the mirror area and the DTC storage area, and is provided as an update enable state to indicate a state in which the update state is complete, and
the processor is further configured to store the update information as the updating state in the update information storage area before the detected DTC is stored in the mirror area and the DTC storage area, and to store the update information as the update enable state after the detected DTC is stored in the mirror area and the DTC storage area.

* * * * *